United States Patent
Herweyer et al.

(10) Patent No.: US 12,013,062 B1
(45) Date of Patent: Jun. 18, 2024

(54) CLAMP ASSEMBLY (71) Applicant: Tramec, L.L.C., Shawnee, KS (US)

(72) Inventors: Craig Herweyer, Holland, MI (US);
Chris Kline, Allendale, MI (US);
Kevin Cornelius, Lees Summit, MO
(US); Jeffrey McKeown, Wake Forest,
NC (US)

(73) Assignee: TRAMEC, L.L.C., Shawnee, KS (US)

( * ) Notice: Subject to any disclaimer, the term of this patent is extended or adjusted under 35 U.S.C. 154(b) by 0 days.

(21) Appl. No.: 18/305,484

(22) Filed: Apr. 24, 2023

(51) Int. Cl.
F16L 3/10 (2006.01)
F16L 3/11 (2006.01)
F16L 3/14 (2006.01)

(52) U.S. Cl.
CPC ........... *F16L 3/1075* (2013.01); *F16L 3/1083* (2013.01); *F16L 3/11* (2013.01); *F16L 3/14* (2013.01)

(58) Field of Classification Search
CPC ......... F16L 3/1075; F16L 3/1083; F16L 3/11; F16L 3/14; Y10T 24/1471; Y10T 24/3956; Y10T 24/1459; Y10T 24/15
See application file for complete search history.

(56) References Cited

U.S. PATENT DOCUMENTS

| 2,048,424 | A | * | 7/1936 | Caldwell | F16L 19/005 |
| | | | | | 285/80 |
| 2,880,761 | A | * | 4/1959 | Peter | B65D 59/00 |
| | | | | | 138/96 T |
| 3,330,354 | A | * | 7/1967 | Chamblee | E21B 33/047 |
| | | | | | 166/313 |
| 3,982,779 | A | * | 9/1976 | Hickey | F16L 21/06 |
| | | | | | 403/311 |
| 4,519,639 | A | * | 5/1985 | Florian | F01N 13/1805 |
| | | | | | 285/415 |
| 5,330,233 | A | * | 7/1994 | Kress | F16L 3/1075 |
| | | | | | 285/903 |
| 8,632,103 | B2 | * | 1/2014 | Fahie | F16L 37/18 |
| | | | | | 285/80 |
| D794,439 | S | | 8/2017 | Papafagos | |
| 10,436,352 | B2 | | 10/2019 | Peterson | |

* cited by examiner

*Primary Examiner* — Robert Sandy
(74) *Attorney, Agent, or Firm* — McGarry Bair PC (57) ABSTRACT An apparatus and method for a clamp assembly including clamp having a first body extending between an attachment end and a hinged end. The first body includes a set of apertures and defines at least a portion of the attachment end. A second body includes a second aperture and defines a remaining portion of the attachment end, the second body hingedly connected to the first body at the hinged end for movement of the first body and the second body between an opened position and a closed position.

20 Claims, 6 Drawing Sheets

CLAMP ASSEMBLY

TECHNICAL FIELD

The disclosure generally relates to a clamp assembly, and more specifically to a clamp assembly for tractor-trailer connections.

BACKGROUND

A tractor-trailer vehicle, which includes a tractor and a trailer pulled by the tractor, often include a number of electrical cables and air hoses extending between the tractor and the trailer. These electrical cables and air hoses are secured at each end to anchor points at the tractor and the trailer. To keep the cables and hoses away from the any moving parts, they are often suspended from the tractor by one or more harnesses.

BRIEF DESCRIPTION OF THE DRAWINGS

A full and enabling disclosure, including the best mode thereof, directed to one of ordinary skill in the art, is set forth in the specification, which refers to the appended figures in which.

DETAILED DESCRIPTION

Aspects of the disclosure described herein are directed to a clamp. More specifically a clamp for holding pneumatic hoses and conductor cables extending between a tractor and a trailer in a tractor-trailer connection. For purposes of illustration, the present disclosure will be described with respect to a tractor-trailer 3-in-1 cable connection. It will be understood, however, that aspects of the disclosure described herein are not so limited and may have general applicability within, other mobile applications and non-mobile industrial, commercial, and residential applications.

Tractor-trailers require communication between the tractor and the trailer in order to properly function. Connecting the two via a conduit allows communication between the tractor and the trailer for the purposes of braking, signaling, and lighting in relation to the tractor function. The conduit can include multiple hoses and cables for connecting the tractor and the trailer. These hoses and cables can be produced in either coiled cables or straight cable connections. Historically the use of coiled air and coiled electric has been common, but it has its own inherent issues that have lead the industry to move more towards straight air and electrical lines bundled into a single homogenous cord with a hard plastic spiral wrap that is in a helix fashion along the entire length of the assembly. This type of conduit is referred to as a "3-in-1" due to it having two air lines (emergency and service) and one electrical cable.

Suspension support between the tractor and trailer is needed in order to prevent the conduit from dragging on the deck or snagging during tight turns. Typically, springs are attached to a back rail located on the back wall of the tractor, via carabiners, and then connected to the conduit to provide additional flexible support while keeping the conduit from getting caught and tangled on any of the numerous points between connections.

In order to provide effective management of the conduit and safe suspension, it is desired to secure all cables defining the conduit easily and effectively at a specified point, and connect them to the suspended support. A clamp described herein is durable enough to withstand various environments, tight enough to maintain grip around the conduit without damage, and easy enough to be installed and removed without the use of any hand tools. Further, the clamp prevents snagging of the conduit. The clamp accomplishes both effective management and safe suspension without further accessories or tools needed.

By incorporating a latching feature as a locking eye for the clamp, the number of components for the clamp described herein is only two, a left and a right half of the clamp. Further a hinge point for the clamp is 180° from the locking eye to eliminate any potential catch or snag issues. A carabiner typically used in the industry can be received in the locking eye and used to lock the clamp in a closed position.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are used only for identification purposes to aid the reader's understanding of the present disclosure, and should not be construed as limiting on an embodiment, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
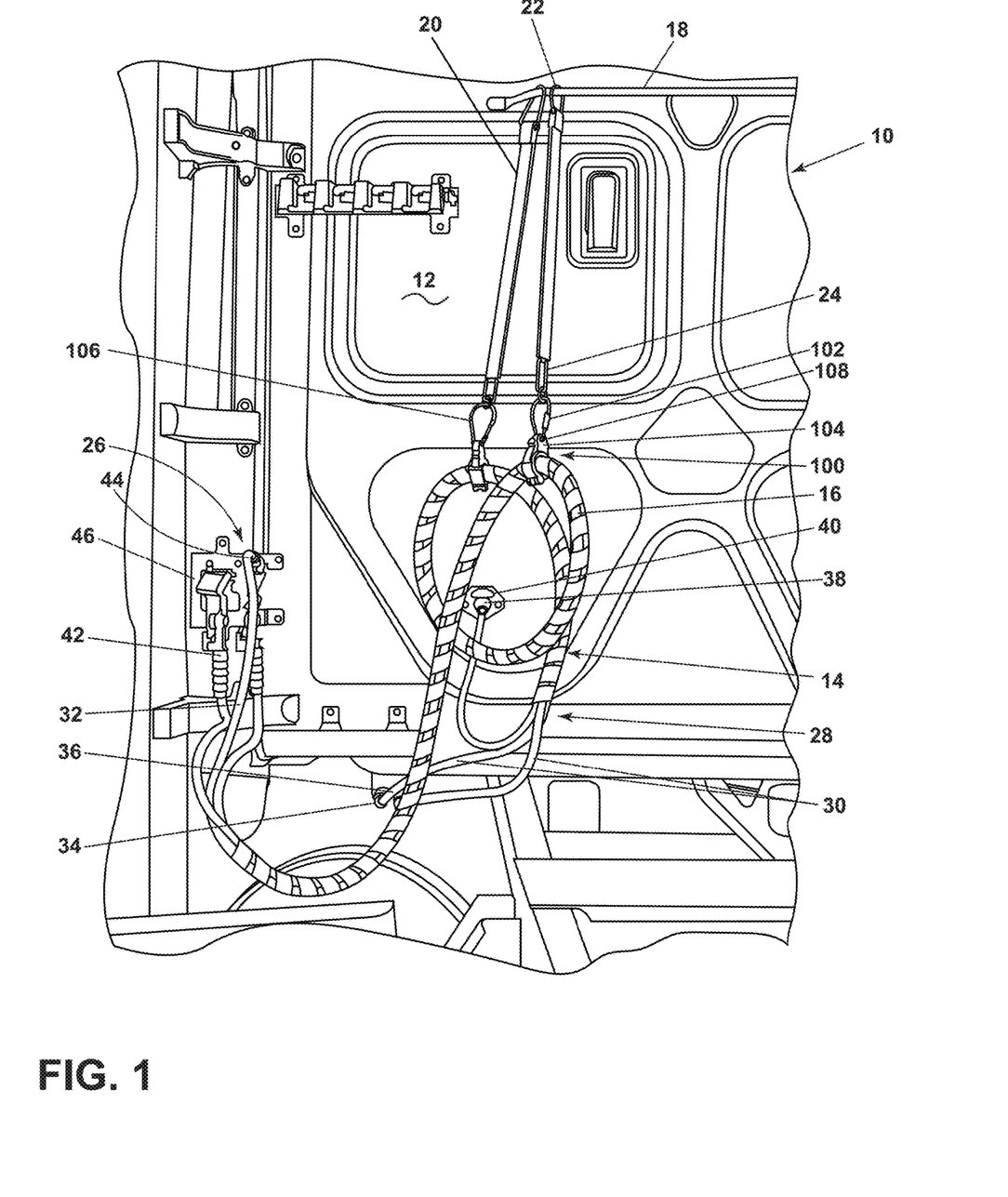
FIG. 1 is a back wall of a tractor with a conduit suspended therefrom and held by a clamp assembly.

FIG. 1 illustrates a back wall 12 of a tractor 10 without a trailer attached. A conduit 14, including multiple cables/hoses 16, is suspended from a suspension rod 18 mounted to the back wall 12. At least one suspension spring 20, illustrated as two suspension springs, is attached to the suspension rod 18 at one end 22 and to a clamp assembly 100 at the other end 24. The clamp assembly 100 includes a shackle 102 and a clamp 104. The shackle 102 can be a carabiner 106, as illustrated, that is received through a locking eye 108 in the clamp 104.

The conduit 14 extends between a tractor end 26 and a trailer end 28. The conduit 14 can be a "3-in-1" and include two pneumatic hoses 30 and an electrical cable 32. The two pneumatic hoses 30 can include emergency and service air lines that terminate at the tractor end 28 in air connections 34. The air connections 34 are connected a set of air valves 36 extending from the tractor 10. The electrical cable 32 terminates at the tractor end 28 in an electric plug 38 that is connected to the tractor 10 via a socket 40 in the back wall 12.

The two pneumatic hoses can include emergency and service air lines that terminate at the trailer end 26 in a set of couplers, referred to herein as gladhands 42. The electrical cable 32 terminates at the trailer end in a connector plug 44. A storage mount 46 is mounted to the back wall 12 and includes sockets for holding each of the set of gladhands 42 and the connector plug 44. When a trailer (not shown) is mounted to the tractor, the set of gladhands 42 and the connector plug 44 are received in corresponding trailer air gladhands (not shown) and a trailer socket (not shown).

Figure 2:
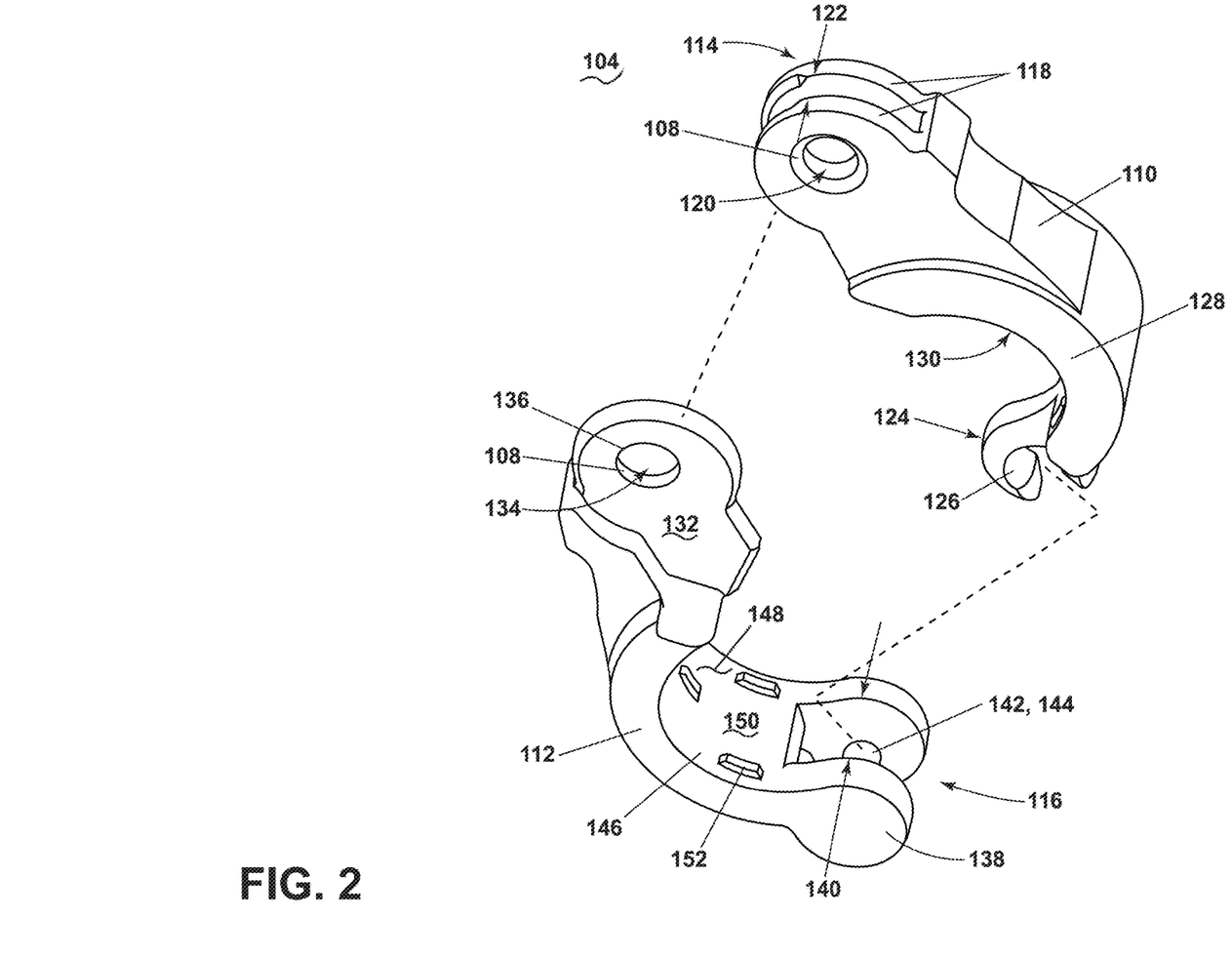
FIG. 2 is an enlarged exploded perspective view of a clamp from the clamp assembly of FIG. 1.

FIG. 2 is an enlarged exploded perspective view of the clamp 104. The clamp 104 is formed from a first body 110 and a second body 112. Both the first body 110 and the second body 112 can be formed with plastic injection molding, though any manufacturing method is contemplated. The first body 110 extends between an attachment end 114 and a hinged end 116. A set of plates 118 defines the attachment end 114 for the first body 110. A set of apertures 120 extend through the set of plates 118 to at least partially define the locking eye 108. The set of plates 118 can be a pair of plates spaced from each other to define a gap 122. While illustrated as a pair of plates, the set of plates 118 can be any number of plates including only one. A middle hinge member 124 defines the hinged end 116 for the first body 110. The middle hinge member 124 is formed into a hook 126. A first rounded segment 128 extends between the set of plates 118 and the middle hinge member 124. The first rounded segment 128 can be formed to define a first semi-circular interior surface 130.

The second body 112 also extends between the attachment end 114 and the hinged end 116. A middle plate 132 defines the attachment end 114 for the second body 112. A second aperture 134 extends through the middle plate 132 to define a remaining portion 136 of the locking eye 108. A set of hinge members 138 define at least a portion of the hinged end 116 for the second body 112. The set of hinge members 138 are spaced from each other to define a hinge gap 140. A pin 142 extends between the set of hinge members 138 to define a remaining portion 144 of the hinged end 116 for the second body 112. A second rounded segment 146 extends between the middle plate 132 and the set of hinge members 138. The second rounded segment 146 can be formed to define a second semi-circular interior surface 148. The first semi-circular interior surface 130 or the second semi-circular interior surface 148 can include a set of protrusions 152. While illustrated as three protrusions, any number of protrusions is contemplated. The first and second semi-circular interior surfaces 130, 148 together define a channel 150 of the clamp 104.

Figure 3:
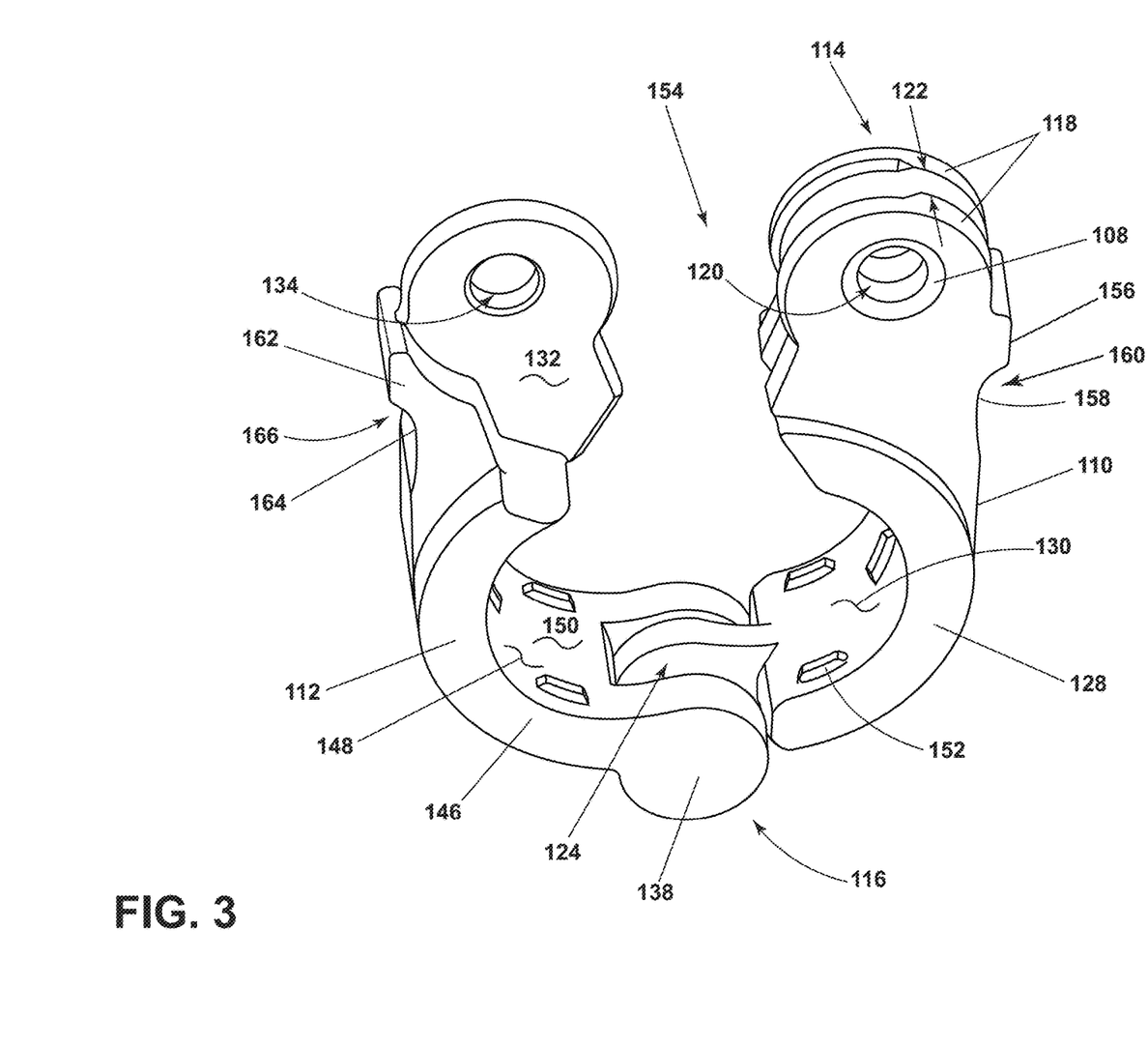
FIG. 3 is the clamp from FIG. 2 in an opened position.

FIG. 3 is an enlarged perspective view of the clamp 104 from FIG. 1 in an opened position 154. The first body 110 is hingedly connected to the second body 112 at the hinged end 116. The middle hinge member 124 is received in the hinge gap 140 for engagement with the pin 142, by way of non-limiting example such that the hook 126 snaps onto the pin 142 (FIG. 2) to define the hinged end 116. Together the first and second rounded segments define the channel 150 for receiving the conduit 14 (FIG. 1) when in the opened position 154. The set of protrusions 152 extend radially into the channel 150. The first semi-circular interior surface 130 and the second semi-circular interior surface 148 both include the set of protrusions 152.

The clamp 104 is formed with a majority of the first body 110 and the second body 112 having rounded geometry with no sharp edges. A first protrusion 156 can extend from the first body 110 proximate the attachment end 114 disposed just beneath the set of plates 118. A first recess 158 can be formed in the first body 110 and defined in part by the first protrusion 156. Together the first protrusion 156 and first recess 158 can form a first finger hold 160. Similarly, a second protrusion 162 can extend from the second body 112 proximate the attachment end 114 and disposed next to the middle plate 132. A second recess 164 can be formed in the second body 112 and defined in part by the second protrusion 162. Together the second protrusion 162 and second recess 164 can form a second finger hold 166. Together the first and second finger holds 160, 166 enable a user to hold the clamp 104 and move the clamp 104 between the opened position 154 and a closed position 168 (FIG. 4) with one hand.

Figure 4:
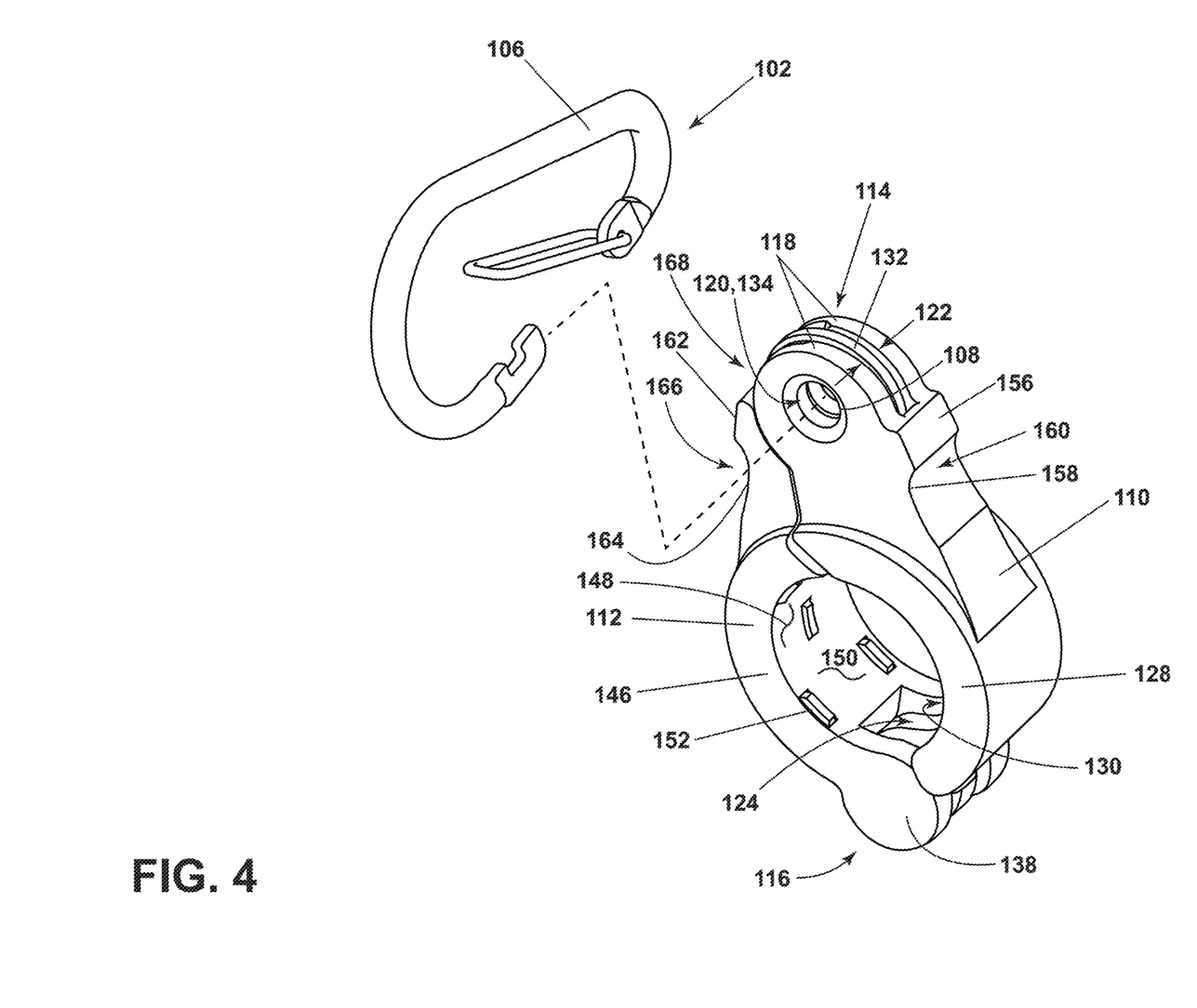
FIG. 4 is an enlarged perspective view of the clamp assembly of FIG. 1 with the clamp in the closed position.

FIG. 4 is an enlarged perspective view of a clamp assembly 100 including the clamp 104 and the carabiner 106 from FIG. 1 with the clamp 104 in the closed position 168. The middle plate 132 is received in the gap 122 when the clamp 104 is in the closed position 168. The set of apertures 120 align with the second aperture 134 to form the locking eye 108 when in the closed position 168. While it is contemplated that the middle plate 132 aligns with a single plate enabling the alignment, the gap 122 provides a guide for the alignment. Further, the hinged end 116 is located 180 degrees from the locking eye 108. The first semi-circular interior surface 130 and the second semi-circular interior surface 148 define the channel 150 as having a circular shape when in the closed position 168. The clamp assembly 100 includes the shackle 102 that can be received through the locking eye 108. In a non-limiting example, the shackle 102 is the carabiner 106. Other types of shackles 102 include, but are not limited to, a snap hook, bolt snap, trigger snap, anchor shackle, dee shackle, headboard shackle, or a twist shackle.

Figure 5:
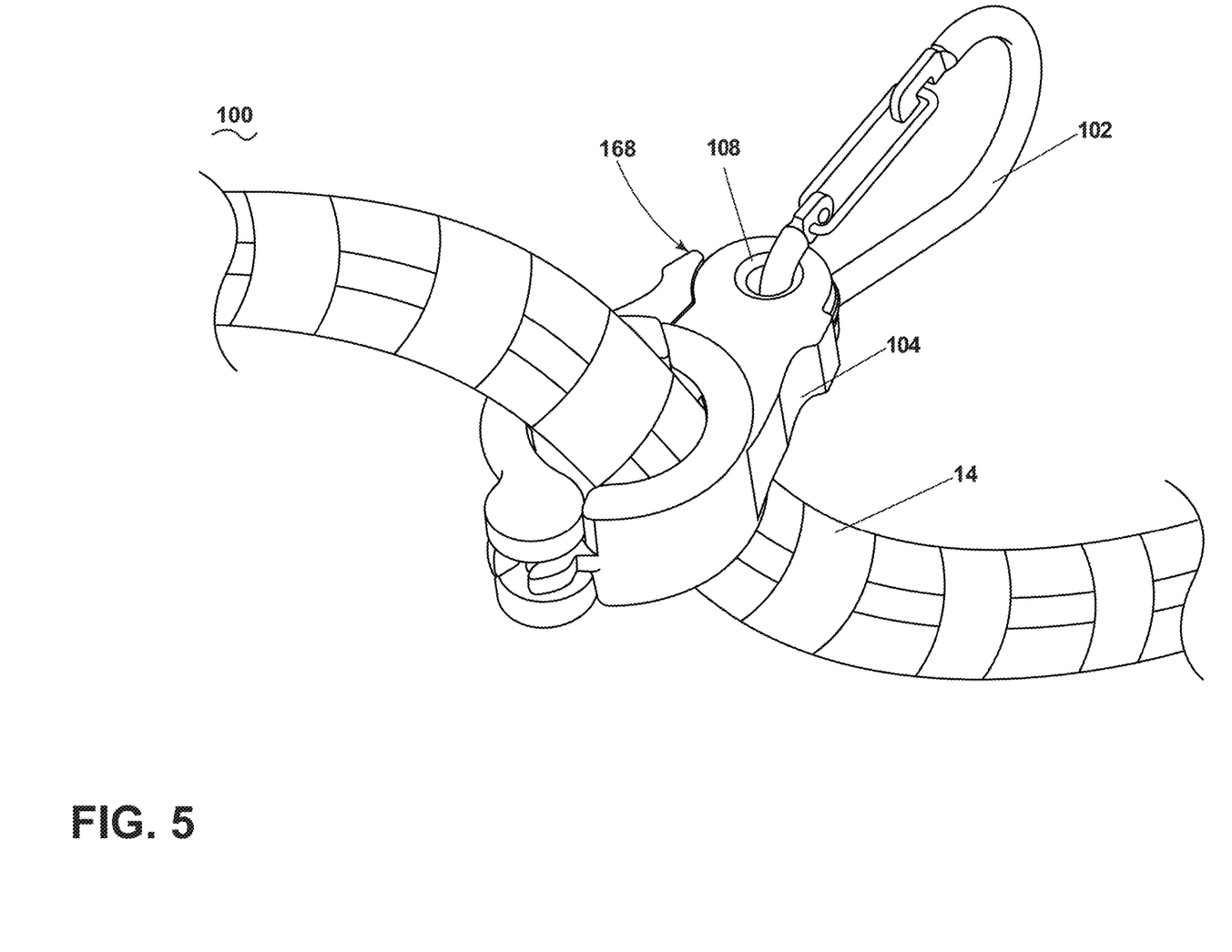
FIG. 5 is the clamp assembly from FIG. 4 with the clamp locked in the closed position by a carabiner and holding the conduit.

FIG. 5 illustrates the clamp assembly 100 holding the conduit 14. The set of protrusions 152 cause an increased friction between the conduit 14 and the set of protrusions 152 (FIG. 4) which enhance the holding capabilities of the clamp assembly 100. Upon squeezing the clamp 104 shut around the conduit 14, the shackle 102 can be inserted through the locking eye 108 to lock the clamp 104 in the closed position 168. Further, when in place, the shackle 102 prevents opening of the clamp 104.

Figure 6:
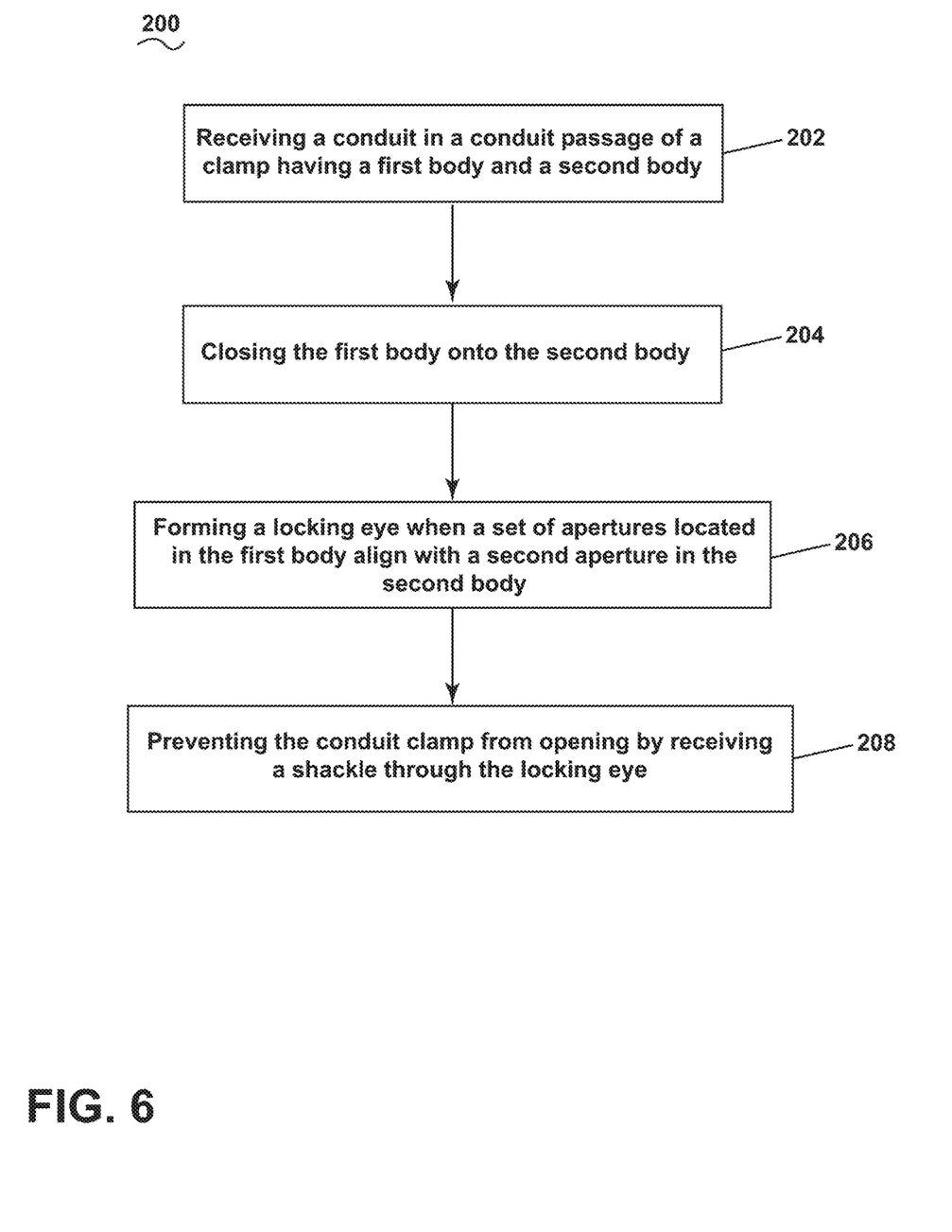
FIG. 6 is a flow chart illustrating a method of clamping the conduit with the clamp assembly from FIG. 1.

FIG. 6 is a flow chart illustrating a method 200 of clamping the conduit with the clamp assembly 100. At block 202 the conduit 14 is received in the channel 150. At block 204 the first body 110 is closed onto the second body 112. At block 206 the locking eye 108 is formed when the set of apertures 120 located in the first body 110 align with the second aperture 134 located in the second body 112. At block 208 the clamp 104 is prevented from opening when the shackle 102 is received through the locking eye 108.

Benefits associated with the disclosure, as described herein, include with only two bodies, the clamp described herein is minimalistic and sleek, lending itself to an easily functioning device that is also robust. A hinge point that is 180° from the locking eye enables greater ease with which to install the clamp over a conduit. Further, the finger holds allow for one-handed use freeing the other hand to lay a "3-in-1" into the clamp. The finger holds enable squeezing by a user's thumbs to align the apertures for and, the subsequent insertion of, the carabiner. This provides control of any variations in the diameter of "3-in-1" conduits, making the clamp usable with different conduit products.

Other clamps utilize a latch mechanism to pull the clamp shut, which can lead to failure. Squeezing the clamp shut with the finger holds adds no unwanted pressure to the hinged end ensuring the clamp is secured shut. The tension caused by the compression of the "3-in-1" to align the apertures, as well as the protrusions along the interior surface of each body, secure it tightly around the "3-in-1".

It should be appreciated that the clamp assembly as described herein can be provided to hold or suspend cables, hoses, or other conduits and is not limited to a "3-in-1" conduit as described herein. Furthermore, it should be appreciated that the clamp assembly, as described herein, can have additional applicability to other industries, and is not limited to tractor trailers as described herein.

To the extent not already described, the different features and structures of the various aspects can be used in combination, or in substitution with each other as desired. That one feature is not illustrated in all of the examples is not meant to be construed that it cannot be so illustrated, but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspect are provided by the subject matter of the following clauses:

A clamp assembly comprising a clamp comprising a first body extending between an attachment end and a hinged end, the first body comprising a set of apertures and defining at least a portion of the attachment end; and a second body having a second aperture and defining a remaining portion of the attachment end, the second body hingedly connected to the first body at the hinged end for movement of the first body and the second body between an opened position and a closed position; wherein the set of apertures and the second aperture together form a locking eye when the clamp assembly is in the closed position.

The clamp assembly of any preceding clause wherein the first body further comprises a set of plates, the set of apertures extending through the set of plates, the set of plates spaced from each other to define a gap.

The clamp assembly of any preceding clause wherein the second body further comprises a middle plate, the second aperture extending through the middle plate, wherein the middle plate is received in the gap when in the closed position.

The clamp assembly of any preceding clause wherein the second body further comprises a set of hinge members defining at least a portion of the hinged end and spaced from each other to define a hinge gap.

The clamp assembly of any preceding clause further comprising a pin extending between the set of hinge members across the hinge gap to define a remaining portion of the hinged end.

The clamp assembly of any preceding clause wherein the first body further comprises a middle hinge member received in the hinge gap to define a remaining portion of the hinged end.

The clamp assembly of any preceding clause wherein the middle hinge member comprises a hook for engagement with the pin.

The clamp assembly of any preceding clause wherein the first body further comprises a first rounded segment and the second body further comprises a second rounded segment, the first rounded segment and the second rounded segment together defining a channel.

The clamp assembly of any preceding clause wherein at least one of the first rounded segment and the second rounded segment is formed with a semi-circular interior surface.

The clamp assembly of any preceding clause wherein the channel has a circular shape when in the closed position.

The clamp assembly of any preceding clause further comprising a set of protrusions extending radially into the channel from at least one of the first body or the second body.

The clamp assembly of any preceding clause further comprising a set of protrusions extending radially into the channel from the first body and the second body.

The clamp assembly of any preceding clause wherein the hinged end is located 180 degrees from the locking eye.

The clamp assembly of any preceding clause further comprising a shackle received in the locking eye.

The clamp assembly of any preceding clause wherein the shackle is a carabiner.

The clamp assembly of any preceding clause wherein a majority of the first body and the second body comprise rounded geometry.

The clamp assembly of any preceding clause wherein the first body and the second body comprise a first finger hold and a second finger holds.

A method of clamping a conduit with a clamp assembly, the method comprising receiving the conduit in a channel of a clamp having a first body and a second body closing the first body onto the second body; forming a locking eye when a set of apertures located in the first body align with a second aperture located in the second body; and preventing the clamp from opening by receiving a shackle through the locking eye.

The method of any preceding clause wherein receiving the shackle comprises receiving a carabiner through the locking eye.

The method of any preceding clause wherein receiving the conduit comprises receiving a 3-in-1 conduit extending between a tractor and a trailer.

The invention claimed is:
1. A clamp assembly comprising:
   a clamp comprising:
      a first body extending between an attachment end and a hinged end, the first body comprising a set of apertures, defining at least a portion of the attachment end, and comprising a hook defining at least a portion of the hinged end for the first body;
      a second body having a second aperture and defining a remaining portion of the attachment end, the second body hingedly connected to the first body at the hook for movement of the first body and the second body between an opened position and a closed position; and
   wherein the set of apertures and the second aperture together form a locking eye when the clamp assembly is in the closed position.

2. The clamp assembly of claim 1 wherein the first body further comprises a set of plates, the set of apertures extending through the set of plates, the set of plates spaced from each other to define a gap.

3. The clamp assembly of claim 2 wherein the second body further comprises a middle plate, the second aperture extending through the middle plate, wherein the middle plate is received in the gap when in the closed position.

4. The clamp assembly of claim 1 wherein the second body further comprises a set of hinge members defining at least a portion of the hinged end and spaced from each other to define a hinge gap.

5. The clamp assembly of claim 4 further comprising a pin extending between the set of hinge members across the hinge gap to define a remaining portion of the hinged end.

6. The clamp assembly of claim 5 wherein the first body further comprises a middle hinge member received in the hinge gap to define the remaining portion of the hinged end.

7. The clamp assembly of claim 6 wherein the middle hinge member comprises the hook for engagement with the pin.

8. The clamp assembly of claim 1 wherein the first body further comprises a first rounded segment and the second body further comprises a second rounded segment, the first rounded segment and the second rounded segment together defining a channel.

9. The clamp assembly of claim 8 wherein at least one of the first rounded segment and the second rounded segment is formed with a semi-circular interior surface.

10. The clamp assembly of claim 9 wherein the channel has a circular shape when in the closed position.

11. The clamp assembly of claim 8 further comprising a set of protrusions extending radially into the channel from at least one of the first body or the second body.

12. The clamp assembly of claim 11 further comprising a set of protrusions extending radially into the channel from the first body and the second body.

13. The clamp assembly of claim 1 wherein the hinged end is located 180 degrees from the locking eye.

14. The clamp assembly of claim 1 further comprising a shackle received in the locking eye.

15. The clamp assembly of claim 14 wherein the shackle is a carabiner.

16. The clamp assembly of claim 1 wherein a majority of the first body and the second body comprise rounded geometry.

17. The clamp assembly of claim 1 wherein the first body and the second body comprise a first finger hold and a second finger hold.

18. A method of clamping a conduit with the clamp assembly of claim 1, the method comprising:
 receiving the conduit in a channel of the clamp;
 closing the first body onto the second body;
 forming the locking eye when the set of apertures located in the first body align with the second aperture located in the second body; and
 preventing the clamp from opening by receiving a shackle through the locking eye.

19. The method of claim 18 wherein receiving the shackle comprises receiving a carabiner through the locking eye.

20. The method of claim 18 wherein receiving the conduit comprises receiving a 3-in-1 conduit extending between a tractor and a trailer.

\* \* \* \* \*